United States Patent [19]

Greco

[11] 3,919,264

[45] Nov. 11, 1975

[54] PROCESS FOR THE PRODUCTION OF ANTHRAQUINONE FROM DIHYDROANTHRACENE

[75] Inventor: Nicholas P. Greco, Edgewood, Pa.

[73] Assignee: Koppers Company, Inc., Pittsburgh, Pa.

[22] Filed: Oct. 29, 1974

[21] Appl. No.: 518,481

Related U.S. Application Data

[63] Continuation-in-part of Ser. No. 264,703, June 21, 1972, abandoned, Continuation of Ser. No. 68,446, Aug. 31, 1970, abandoned.

[52] U.S. Cl. .............................. 260/385; 260/369
[51] Int. Cl.² ..................... C07C 49/68; C09B 1/06
[58] Field of Search ............................. 260/369, 385

[56] References Cited
UNITED STATES PATENTS

| | | | |
|---|---|---|---|
| 1,103,383 | 7/1914 | Singer | 260/385 |
| 3,163,657 | 12/1964 | Morgan | 260/385 |
| 3,505,361 | 4/1970 | Greco | 260/385 |

FOREIGN PATENTS OR APPLICATIONS

| | | |
|---|---|---|
| 1,124,440 | 8/1968 | United Kingdom |

*Primary Examiner*—Arthur P. Demers
*Attorney, Agent, or Firm*—Oscar B. Brumback; Herbert J. Zeh, Jr.

[57] ABSTRACT

A mixture of nitric acid and dihydroanthracene that is dissolved in an inert solvent is maintained at elevated temperatures with agitation until the dihydroanthracene is oxidized to anthraquinone. The anthraquinone is thereafter separated from the reaction mass.

4 Claims, No Drawings

PROCESS FOR THE PRODUCTION OF ANTHRAQUINONE FROM DIHYDROANTHRACENE

CROSS-REFERENCE TO RELATED APPLICATIONS

This application is a continuation-in-part of application Ser. No. 264,703 filed on June 21, 1972 and now abandoned as a continuation of application Ser. No. 68446 filed on Aug. 31, 1970, and now abandoned.

BACKGROUND OF THE INVENTION

Anthraquinone is a valuable intermediate for the manufacture of dyes, and such use requires extremely pure anthraquinone. Prior attempts to produce anthraquinone from dihydroanthracene have involved the reaction of dihydroanthracene with oxygen in a basic medium.

U.S. Pat. No. 3,163,657, "Process for the Oxidation of Partially Hydrogenated Polycyclic Aromatic and Heterocyclic Compounds" describes a process for producing anthraquinone by, in the preferred case, dissolving 1 mole of dihydroanthracene in a liter of pyridine containing about 5% water and a catalyst which is either benzyltrimethylammonium hydroxide or benzyltrimethlammonium methoxide and passing oxygen through this solution at a reaction temperature below 90°C. Under the most favorable conditions the patent discloses a yield of only 85% of anthraquinone from the dihydroanthracene. The average conversion is about 74%. Because of this low conversion, it is necessary to recycle the mother liquor.

U.S. Pat. No. 3,505,361, "Preparation of Anthraquinone from Crude Coal Tar," also discloses the production of anthraquinone by the reaction of dihydroanthracene with oxygen in the presence of a generally basic material such as the alkali metal hydroxides, carbonates and bicarbonates. The highest yield for this process was disclosed to be 35% and the average yield about 74%.

Singer et al. U.S. Pat. No. 1,103,383 "Process of Making Anthraquinone," discloses reacting nitric acid directly with anthracene in an inert solvent at temperatures below 60°C to form an unstable meso-nitro anthracene derivative and raising the temperature to change the dirivative to anthraquinone. Singer et al. claims good yields. The Singer et al. process has not become commercially successful, however, because of the great danger of possibly nitrating the solvent, i.e., the nitrobenzene or glacial acetic acid, or the impurities in the anthracene, i.e., carbazole, and forming explosive compounds.

A typical specification for anthraquinone for dye purposes specifies a freezing point for the anthraquinone of 284.7° ± 0.05°C. With the production in low yields of anthraquinone or of anthraquinone with a low melting point (278–281 for Singer et al.), it becomes expensive to purify the product to a degree for a dye grade of anthraquinone.

SUMMARY OF THE INVENTION

It is now been found, in accordance with this invention, that dihydroanthracene can be converted to anthraquinone in nearly quantitative amounts and in a high degree of purity. The process involves agitating and maintaining a mixture of nitric acid and a solution of dihydroanthracene in an inert solvent at an elevated temperature, for example, at a reflux or boiling temperature, until the dihydroanthracene is converted to anthraquinone. The anthraquinone is thereafter separated from the reaction mass as substantially pure anthraquinone.

In a preferred process a solution containing about 30% dihydroanthracene in an inert organic solvent is formed by dissolving the dihydroanthracene in a solvent such as chlorobenzene. This solution and nitric acid are mixed together with agitation and the mixture is heated to convert substantially all the dihydroanthracene to anthraquinone. This completion of the conversion is noted by the disappearance of the fumes of oxides of nitrogen.

The exact mechanism of the reaction is not known; i.e., whether the reaction be an ionic or a radical-type reaction. Whatever type or types of reactions occur, the result is that nearly quantitative yields of anthraquinone are obtained. The theoretical equation for the reaction is:

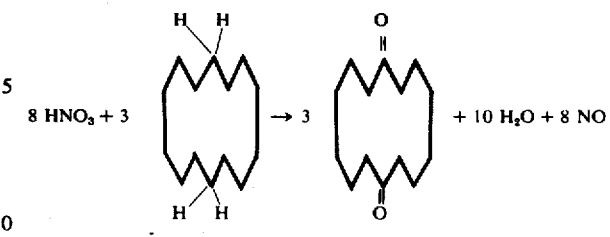

The theoretical amount of nitric acid required for the oxidation of dihydroanthracene to anthraquinone is 2.67 moles of nitric acid per 1 mole of dihydroanthracene. It has been found, however, in the pratice of this invention that stochiometric amounts of nitric acid and dihydroanthracene do not provide the quantitative yield of anthraquinone. The optimum yield seems to be when about 4.5 moles of nitric acid is used per 1 mole of dihydroanthracene. It is postulated that the need for additional nitric acid arises because the intermediate structure, which is a precursor to anthraquinone, probably decomposes thermally to anthraquinone with a resulting formation of nitric oxide and nitrogen dioxide.

The process of this invention has been carried out successfully with nitric acid concentrations of 45 – 70%. If the concentration of nitric acid be too high, there could be a tendency for the acid to attack the solvent. It has been found that nitric acids having concentrations of 60% and of 70% give equally good yields. This is advantageous because the nitric acid most readily obtained commerically is an azeotrope; the usual acid strength being 65 – 68% nitric acid. The acid becomes diluted in the reactions of the process of this invention so that the spent nitric acid has a concentration of normally from 20 to 25% and thus is too weak to nitrate further.

Useful solvents are those that dissolve dihydroanthracene and are inert to nitric acid. Particularly useful solvents are the halogenated solvents such as perchloroethylene, bromobenzene, chlorobenzene, 1,2-dibromobenzene, 1,3-dibromobenzene, 1,2-dichlorobenzene, 1,3-dichlorobenzene, m-bromochlorobenzene, and 1,2-4-trichlorobenzene.

The concentration of the dihydroanthracene in the solvent does not appear to be critical. The optimum concentration for the dihydroanthracene in solution in the solvent chlorobenzene has been found to be about 30%. At this concentration the slurry of intermediate products and the resulting anthraquinone are easily agitated. The oxidation of 35% solution of dihydroanthracene resulted in a poor quality product; but this result could be due to the difficulty in agitating the heavy slurry.

Substantially pure dihydroanthracene can readily be obtained and desirably, pure dihydroanthracene is used in this process of the invention. The process, however, can be carried with 10% or less anthracene in the dihydroanthracene, i.e. the purity of the dihydroanthracene should be at least 90%. The amount of anthracene diluent in the dihydroanthracene affects adversely the quantitative nature of conversion and the purity of the resultant product.

Upon cooling of the reaction mass, the crystals of anthraquinone can be readily separated from the liquid portion of the reaction mass. The product anthraquinone is of high purity. However, the product can be further purfied by recrystallization from nitrobenzene for example.

Upon the mixing of the nitric acid with the solution of dihydroanthracene, the conversion to anthraquinone begins to accur slowly at room temperature as an exothermic reaction. The kinetics of the reaction are such, however, that the reaction takes place better at an elevated temperature where complete conversion of the dihydroanthracene to anthraquinone takes place at a more rapid rate. The higher the temperature, through, the greater is the tendency for the acid to attack the solvent. Conveniently, the reaction is carried out at reflux conditions as the temperature of these conditions can be readily controlled by control of condensate return and pressures.

EXAMPLE I

As an illustration of the process of the invention, a solution was made by dissolving dihydroanthracene (100 grams, 0.55 mole) in chlorobenzene (231.5 grams). This solution at a temperature of 38°C and aqueous 60% nitric acid (233.4 grams, 2.22 moles) were fed simultaneously to a liter flask equipped with agitator and condenser while the flask was immersed in a water bath and held at room temperature. The reactants were charged into the flask in approximate ratios of 2 milliliters of dihydroanthracene solution of 1 milliliter of nitric acid over a period of 1.5 hours total feed time. The charge was stirred and held below 50°C during the addition, and nitric oxide was evolved from the mixture.

After completion of the addition, the stirred charge was gradually heated to reflux (about 95°C) and refluxed for a period of 7 hours, after which period the evolution of oxides of nitrogen ceased. The hot slurry was cooled to about 25°C and filtered. The solids, which were the product anthraquinone, remaining on the filter were washed with boiling water and then were vacuum-dried to constant weight. The solids weighed 110 grams to give 96% yield of anthraquinone, m.p. 285° – 6°C (slightly off-shade).

The crude anthraquinone product was recrystallized from 256 grams of nitrobenzene. The crystals were washed on the filter with two 75 milliliter portions of fresh nitrobenzene, and vacuum-dried to constant weight of 107 grams. This gave a yield of 94% based on dihydroanthracene of 100% pure (by freezing point 284.7°C) anthraquinone, (bright, pale-yellow crystals).

EXAMPLE II

As another illustration of the invention, aqueous nitric acid (68% $HNO_3$) and a solution of dihydroanthracene dissolved in chlorobenzene (30% by weight of the solution was dihydroanthracene) were fed into a stirred reactor whose temperature was maintained at 90°C. The nitric acid and the chlorobenzene solution of dihydroanthracene were fed into the reactor with agitation over a period of 1 hour at a rate such that 4.5 moles of nitric acid were present per 1 mole of dihydroanthracene. After the reactants had been added, the reactants were maintained under agitation and at a reflux temperature (about 95°C) with the reflux condensate being returned to the reactor.

When the evolution of oxides of nitrogen had ceased (after about 10 hours), the reaction mass was cooled to room temperature and the solids filtered from the reaction mass. The solids were washed with an equal weight of chlorobenzene. Then, the solids were placed in hot water and steam was passed through the water to remove any residual chlorobenzene. The solids were filtered from the water and dried. The solids were crystals of pure anthraquinone and the yield was 95% based on the weight of dihydroanthracene.

EXAMPLE III

As a further example, 1.45 lb. of 99% — purity dihydroanthracene was dissolved in 3.34 lb. of monochlorobenzene and added to a 10-gallon, jacketed, 304 stainless-steel reactor equipped with a six-inch turbine containing six pitch blades and operating at 700 RPM, four baffles, thermowell, and a reflux condenser. While maintaining this mixture at a temperature of 35°– 50°C, 3.52 lb. of 65% nitric acid was fed at point above the surface of the solution over a 0.5-hour period thereby providing 4.5 moles of nitric acid per mole of dihydroanthracene. Then, 33.5 lb. of the same concentration of dihydroanthracene in monochlorobenzene and 24.6 lb. of 65% nitric acid were fed continuously, as separate streams, to the reactor over a 1.75-hour period. The contents of the reactor were held at 40°– 50°C during this period. (This is an exothermic reaction.) After all the material was in the reactor, the temperature of the reactor contents was increased slowly (over a period of 3.5 hours) until the mixture began to reflux 93°C. The rate of heatup to reflux was controlled by the quantity of gases being evolved and the quantity of entrainment in the gases. Only a 6-ft. length of 1-in. stainless steel pipe was used as a condenser and was the limiting factor in the rate of heating the contents of the reactor. The reaction mixture was allowed to reflux for 8 hours. The gases evolved during the entire reaction period were cooled in a condenser and were passed through a water scrubber containing ceramic Berl saddles.

Following the reflux period, the slurry in the reactor was cooled to about 25°C and was centrifuged to remove crude anthraquinone solids. The crude anthraquinone was boiled in water to remove the adhering monochlorobenzene and then water-washed in a centrifuge to remove residual nitric acid. The solids were then vacuum-dried at 85°C and at about 50 torr to obtain 12.3 lbs. or a 92.5% yield. The purity, by freezing point depression, of the anthraquinone obtained was 99.8% with a freezing point of 284.6°C.

EXAMPLE IV

To illustrate the effect of an impurity such as anthracene, a solution was made by dissolving pure dihydroanthracene (38.9 g., 0.21 m) and pure anthracene (4.3g., 0.024 m) in chlorobenzene (100 This solution at a temperature of 38°C and aqueous 68% nitric Acid (97.3G., 1.05m) were fed simultaneously to a 0.5 liter flask equipped with agitator and condenser while the flask was immersed in a water bath and held at room temperature. The reactants were charged into the flask in approximate ratio of 2 ml of dihydroanthracene solution to 1 ml of nitric acid over a period of 1 hour total feed time. The charge was stirred and held below 51°C during the addition, and oxides of nitrogen were evolved from the mixture.

After completion of the addition, the stirred charge was gradually heated to reflux (about 95°C) and refluxed for a period of 10 hours after which the evolution of oxides of nitrogen ceased. The hot slurry was cooled to about 25°C and filtered. The solids, which were the product anthraquinone remaining on the filter, were washed with chlorobenzene (50 g.) and boiling water and vacuum dried at 120°C to constant weight. The freezing point of the product was 283°C which was 1.5°C low and which corresponds to a purity of 98.1% based on the cryoscopic constant for anthraquinone of 1.26 mole % per 1°C.

The foregoing has described a process for the production of anthra quinone of high purity and in good yield. The high purity is produced without need for costly work up procedures for enhancing the purity.

While the foregoing has disclosed a process for converting dihydroanthracene to anthraquinone using batch techniques it will be readily understood by one skilled in the art that the process of the invention can be carried out in a continuous manner. In the latter case, however, a substantial residence time in the reactor will be required to produce the anthraquinone in quantitative yields.

What is claimed is:

1. A process for the production of anthraquinone of high purity which comprises:
   a. adding to a mixing zone at a temperature below reflux temperature:
      i. a solution of dihydroanthracene having a purity of at least 90% in a solvent that is inert to nitric acid; and
      ii. aqueous nitric acid having a concentration of 45 – 70% and wherein the nitric acid is in excess of the stoichiometric amount that is necessary to convert the dihydroanthracene to anthraquinone;
   b. maintaining the resultant mixture under agitation and at a temperature of about the reflux temperature of said resultant mixture for a period of time sufficient to convert the dihydroanthracene to anthraquinone; and
   c. cooling the mixture whereupon the anthraquinone becomes solids, and
   d. thereafter separating the anthraquinone solids from the reaction mixture.

2. The process of claim 1 wherein said solvent is selected from the class consisting of perchloroethylene, bromobenzene, chlorobenzene, 1,2-dibromobenzene, 1,3-dibromobenzene, 1,2-dichlorobenzene, 1,3-dichlorobenzene, m-bromochlorobenzene, and 1,2-4-trichlorobenzene.

3. The process of claim 1 wherein the dihydroanthracene constitutes about 30% of the total weight of said solution.

4. The process of claim 1 wherein 4.5 moles of nitric acid per mole of dihydroanthracene are used.

* * * * *